United States Patent

[11] 3,629,628

| [72] | Inventors | William E. Rank<br>Dayton;<br>Gene L. Dafler, New Lebanon, both of Ohio |
|---|---|---|
| [21] | Appl. No. | 52,557 |
| [22] | Filed | July 6, 1970 |
| [45] | Patented | Dec. 21, 1971 |
| [73] | Assignee | General Motors Corporation<br>Detroit, Mich. |

[54] COOLING ARRANGEMENT FOR A SQUIRREL CAGE ROTOR ASSEMBLY
4 Claims, 5 Drawing Figs.

[52] U.S. Cl. .................................................. 310/54,
310/61, 310/211
[51] Int. Cl. ..................................................... H02k 9/00,
H02k 3/06
[50] Field of Search ........................................... 310/52, 54,
68 D, 71, 211

[56] References Cited
UNITED STATES PATENTS

| 1,448,700 | 3/1923 | Seidner .................... | 310/54 |
| 3,056,055 | 9/1962 | Willyoung et al. .......... | 310/54 X |
| 686,856 | 11/1901 | Davies..................... | 310/61 |
| 3,075,104 | 1/1963 | Willyoung et al. .......... | 310/54 |
| 3,320,447 | 5/1967 | Banchieri .................. | 310/61 X |
| 3,488,532 | 1/1970 | Endress et al.............. | 310/211 X |

Primary Examiner—J. D. Miller
Assistant Examiner—Mark O. Budd
Attorneys—E. W. Christen, C. R. Meland and Robert W. Smith ABSTRACT: In a preferred form, a cooling arrangement for a squirrel cage rotor assembly of an alternating current electric drive motor includes a pair of rotor end plates clamped to the ends of a rotor core carrying a pair of conductive end rings extending from the ends of the rotor core. The rotor end plates form end ring cooling cavities circumscribing the inner peripheries of the end rings. The rotor core is carried by the motor shaft and a recessed area on the outer diameter of the shaft forms axial cooling channels in heat conducting relation with the inner bore of the rotor core. A pair of concentric axial shaft passages extend through a bore in the center of the shaft and communicate with radial shaft passages connected with the end ring cooling cavities and with the axial cooling channels. A hollow insert is mounted in the shaft bore for separating the pair of axial shaft passages. A liquid coolant is circulated from one end of the shaft through the end ring cooling cavities and the annular cooling chamber to transfer heat from the end ring and the rotor core.

INVENTORS
William E. Rank, &
BY Gene L. Dafler
Robert W. Smith
ATTORNEY

COOLING ARRANGEMENT FOR A SQUIRREL CAGE ROTOR ASSEMBLY

This invention relates to squirrel cage rotor assemblies and more particularly to a cooling arrangement for cooling the rotor core and end ring parts of a squirrel cage rotor assembly.

Induction motors of the squirrel cage rotor type are often employed because of their inherent ruggedness and reliability. In higher power applications, the current density developed in squirrel cage rotor windings reaches high levels which causes excessive heat to be generated. Provision for motor cooling must be made so that the maximum output and efficiency can be obtained when the motor is operated with heavy-duty loads in adverse ambient conditions. Ventilation and air-circulating techniques employed for cooling of smaller squirrel cage rotor assemblies is sometimes found inadequate.

Heat which is developed in the rotor assembly of one general type of large squirrel cage induction motor disclosed herein is distributed with about 60 percent of the rotor heat generated by the conductor bars of the squirrel cage winding and about 40 percent generated by the conductive end rings. It is therefore necessary to provide a cooling arrangement for circulating a coolant which is capable of transferring heat from both the rotor core which carries the conductor bars and from the end rings carried at the opposite ends of the rotor core.

It has been observed that when the squirrel cage winding is formed of an aluminum conductive material and when the motor is operated at high temperatures, the material of the end rings becomes soft and substantially loses resistance to stresses developed at higher rotor speeds. The end rings tend to separate from the ends of the rotor core due to high rotationally produced forces. Accordingly, the end rings must be supported so as to prevent deformation and separation from the ends of the conductor bars and the rotor core. When the end rings are being supported, ventilation and air circulation is further limited so that transfer of heat from the end rings and rotor core is improved by use of a liquid coolant such as oil. A cooling arrangement for circulating a liquid coolant through the squirrel cage rotor assembly is preferably made by conventional manufacturing techniques that are not unduly expensive nor require complicated mounting and assembling operations to maintain the high degree of reliability and service life of the rotor assembly.

In accordance with the present invention, a cooling arrangement for a squirrel cage rotor assembly rotatably mounted in an alternating current drive motor includes a laminated rotor core carrying a squirrel cage winding having a series of conductor bars terminated by a pair of conductive end rings extending axially from the ends of the rotor core. A cylindrical shaft sleeve is provided for mounting the rotor core on the motor shaft. A pair of annular rotor end plates are mounted at the ends of the rotor core and are formed with annular support cavities receiving the end rings when the plates are clamped against the ends of the rotor core. Inner radial side sections of the rotor end plates are spaced from the ends of the rotor core so as to provide annular end ring cooling cavities circumscribing the inner peripheries of the end rings. Oil diverter plates are disposed within the end ring cooling cavities for directing coolant flow to the end rings. A pair of clamping rings mounted on the ends of the shaft sleeve force the rotor end plates into contact with the ends of the rotor core so that the annular support cavities surround the end rings and the rotor core is axially compressed. The shaft sleeve includes first and second pairs of radial holes wherein each pair of radial holes communicates with opposite sides of the oil diverter plates.

The motor shaft includes a pair of concentrically disposed axial passages communicating with a first and second series of radial shaft passages which further communicate with the two pairs of radial sleeve holes. Axial cooling channels formed on the outer diameter of the shaft extend axially between the two inner holes of the pairs of radial sleeve holes. A third series of radial shaft passages communicate with the axial cooling channels and the inner axial shaft passage. The pair of concentric axial shaft passages are separated by a hollow insert disposed in the center of the outer axial shaft passage so that coolant is directed from the outer axial shaft passage to opposite ends of the rotor core and the pair of conductive end rings, and then through the axial cooling channels to return through the inner axial shaft passage.

It is an object of this invention to provide a cooling arrangement for a squirrel cage rotor assembly of an alternating current electric drive motor in which a closed cooling circuit path is formed between axially extending shaft passages and end ring cooling cavities circumscribing a pair of conductive end rings extending from opposite ends of the rotor core.

It is a further object of this invention to provide a cooling arrangement for a squirrel cage rotor assembly in which a laminated rotor core including a squirrel cage winding having a pair of conductive end rings extending axially from the rotor core ends is axially supported on a rotatable shaft by a pair of rotor end plates which enclose the ends of the rotor core so that the inner peripheries of the pair of conductive end rings are disposed adjacent annular cooling cavities formed between the ends of the rotor core and the pair of rotor end plates for transferring heat generated therein to a coolant directed through the annular cooling cavities.

A still further object of this invention is to provide a cooling arrangement for a squirrel cage rotor assembly including a laminated rotor core mounted on a shaft with rotor end plates axially supporting the ends of the rotor core and enclosing a pair of conductive end rings extending from the rotor core ends to form annular cooling cavities circumscribing the inner peripheries of the conductive end rings wherein radial shaft passages direct a flow of liquid coolant to the annular cooling cavities and a pair of flow diverter plates form circuitous flow paths in the cooling cavities to direct the liquid coolant against the inner peripheries of the conductive end rings and along the rotor core ends.

And a still further object of this invention is to provide a cooling arrangement for a squirrel cage rotor assembly of an alternating current induction motor in which a liquid coolant is directed through annular cooling cavities formed at the ends of a laminated rotor core for cooling a pair of conductive end rings in which the liquid coolant is further directed to axial cooling channels formed within the bore of the rotor core and a pair of concentrically disposed and axially extending shaft passages are connected to coolant inlet and discharge openings supported at one end of the motor housing, and further wherein a hollow insert is mounted in the center of the outer axial shaft passage and terminates the inner axial shaft passage to discharge the liquid coolant from the axial cooling channels and to the inner axial shaft passage with the recessed sides of the hollow insert permitting the entering liquid coolant to flow to opposite ends of the outer axial shaft passage.

Further objects and advantages of the present invention will be apparent from the following description, reference being had to the accompanying drawings wherein a preferred embodiment of the present invention is clearly shown.

Figure 1:
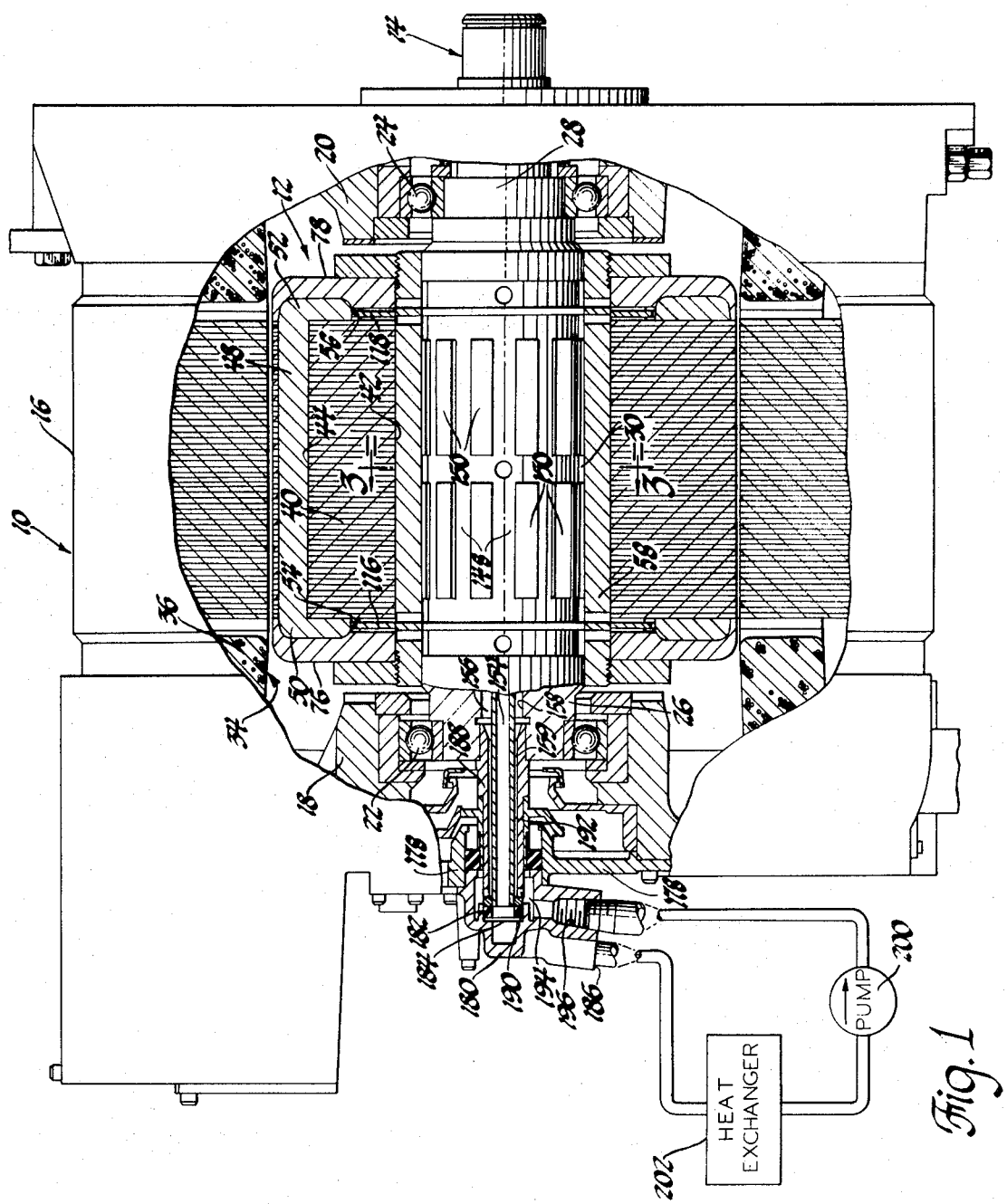
FIG. 1 is an elevational view partially in section of an alternating current induction motor having a cooling arrangement for a squirrel cage rotor assembly made in accordance with the present invention.

Referring now to the drawings and more particularly to FIG. 1, the reference numeral 10 generally designates an electric drive motor including a squirrel cage rotor assembly 12 made in accordance with the present invention. The electric drive motor 10 is an alternating current induction motor intended for use in one preferred embodiment as a traction motor for large, heavy-duty vehicles of the earthmoving or off-highway types. The drive motor 10 is capable of developing a maximum torque of 900 foot-pounds to the motor shaft 14 over a variable speed range up to high speeds of 12,000 r.p.m. The motor shaft is suitably coupled to one or more of the driving wheels of a vehicle through a suitable gearing arrangement, not shown.

A housing 16 supports a pair of end frame sections 18 and 20 carrying bearing assemblies 22 and 24. The opposite ends 26 and 28 of the shaft 14 have reduced diameters journaled for rotation in the inner races of the bearing assemblies 22 and 24. The center section 30 of the shaft 14 fixedly supports the remaining parts of the rotor assembly 12 as described more fully hereinbelow. A stator assembly 34 includes a polyphase input winding 36 for developing a magnetic flux which electrodynamically reacts with the winding arrangement of the squirrel cage rotor assembly 12 in accordance with the understood operation of squirrel cage induction motors.

Figure 2:
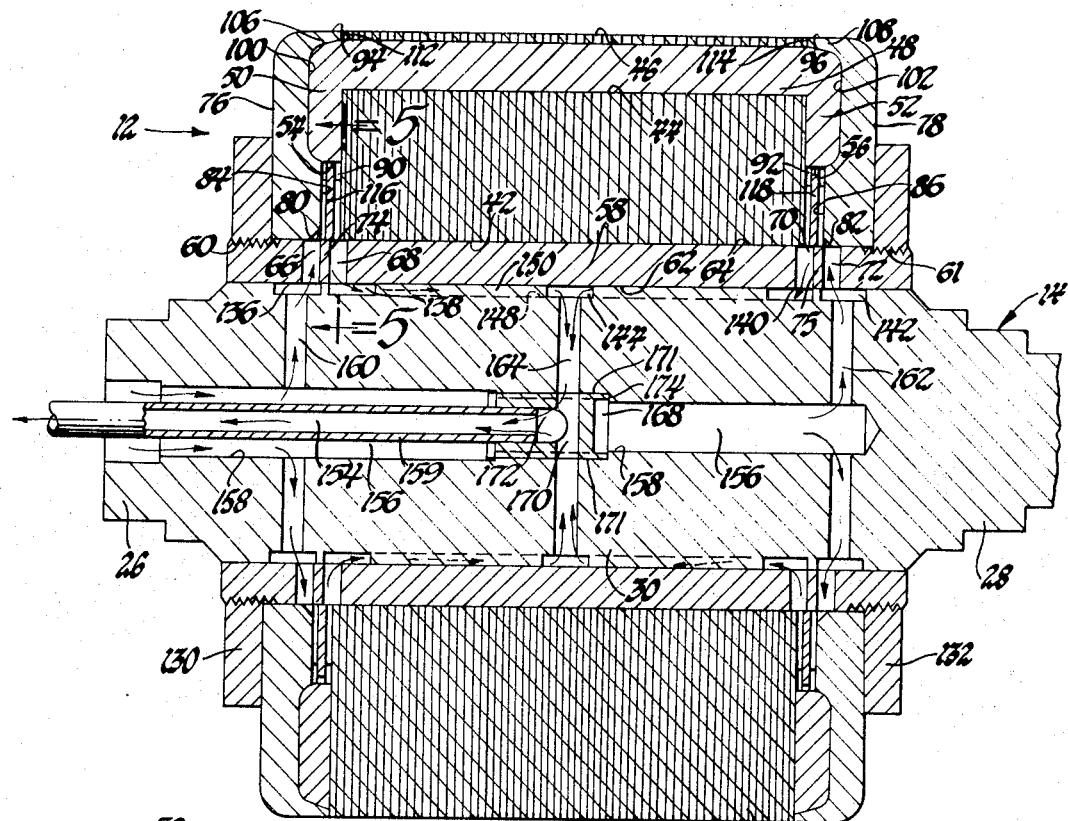
FIG. 2 is a sectional view of the squirrel cage rotor assembly illustrated in FIG. 1.

The squirrel cage rotor assembly 12 illustrated more clearly in FIG. 2 includes a cylindrical rotor core 40 formed of a stack of disk-shaped laminations made of a suitable magnetic iron material. A circular mounting bore 42 extends axially through the center of the rotor core 40 and a circumferential series of winding slots 44 extend axially adjacent the outer diameter 46 of the rotor core 40. A squirrel cage winding arrangement included in the rotor assembly 12 includes conductor bars 48 carried in each of the winding slots 44 and a pair of conductive end rings 50 and 52 formed integrally with the ends of the conductor bars. The pair of end rings 50 and 52 extend axially from the ends of the rotor core and radially inward from the conductor bars 48 to inner circular peripheries 54 and 56. The conductor bars 48 and the pair of end rings 50 and 52 are made of an electrically conductive material such as aluminum fabricated to the rotor core 44 in a die casting operation.

A shaft sleeve 58 made of a hollow cylindrical steel material carries the rotor core 40 and extends the length of the center shaft section 30 which extends beyond the ends of the rotor core 40. The outer axial ends 60 and 61 of the shaft sleeve are externally threaded. The sleeve inner diameter 62 is shrink fitted to the center shaft section 30 and the sleeve outer diameter 64 is clamped against the rotor core bore 42 when it is expanded by the shrink fit with the shaft.

A first pair of radial holes 66 and 68 extend through the sleeve near the end 60 and a second pair of radial holes 70 and 72 extend through the sleeve near end 61. Each of the radial sleeve holes 66, 68, 70 and 72 is a series of circumferentially spaced hole passages axially located at opposite ends of the rotor core 40. In each pair of the sleeve holes, one series of holes is axially separated from the other series of holes by circumferential sleeve sections indicated at 74 separating the first pair of holes 66 and 68 and circumferential section 75 separating the second pair of holes 70 and 72.

A pair of annular rotor end plates 76 and 78 made of a high strength nonmagnetic material, such as titanium, are provided adjacent the ends of the rotor core 40. The inner diameter of each of the rotor end plates 76 and 78 is mounted on the shaft sleeve 58 and so as to overlap the two axially outer sleeve holes 66 and 72. Chamfered surfaces 80 and 82 are provided on each rotor end plate along the inner axial side of the inner diameters to expose the ends of the two series of outer sleeve holes 66 and 72, respectively.

The inner radial side sections 84 and 86 of each of the rotor end plates 76 and 78, respectively, are spaced from the opposite ends of the rotor core 40. This forms a pair of annular end ring cooling cavities 90 and 92, respectively, formed between the radial side sections 84 and 86 of the rotor end plates and the axially adjacent rotor end and circumferentially between the inner peripheries 54 and 56 of the end rings 50 and 52 and the shaft sleeve 58. The first and second pairs of radial sleeve holes 66, 68 and 70, 72 are disposed radially below the end ring cooling cavities 90 and 92, respectively, so as to communicate with the opposite radial side portions thereof for directing a flow of coolant therein as described hereinbelow.

The outer diameters 94 and 96 of the rotor end plates 76 peripheries 78, respectively, are substantially the same as the outer diameter 46 of the rotor core 40. Annular recessed portions 100 and 102 forming concave end ring support cavities are disposed on the inner axial sides of the rotor end plates 76 and 78, respectively, and adjacent the outer diameters 94 and 96 thereof. The end plate cavities 100 and 102 are shaped complementary to the contours of the pair of end rings 50 and 52 so that the outer radial sides of the cavities contact the corresponding outer diameter portions of the end rings to substantially seal the outer periphereis and provide support thereof.

Annular lips 106 and 108 are formed by the end plate cavities so that the lips 106 and 108 extend axially inward around the outer diameters of the rotor end plates 76 and 78. The axial ends 112 and 114 of the annular lips 106 and 108, respectively, abut the axial ends of the rotor core 40 around the outer radial portions thereof.

Figure 4:
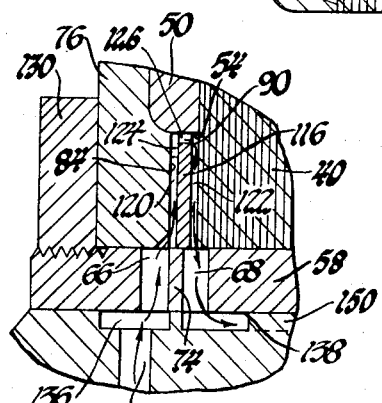
FIG. 4 is an enlarged fragmentary view of FIG. 2 illustrating one of the end ring cooling cavities provided at the ends of a laminated rotor core end formed in accordance with the present invention.
Figure 5:
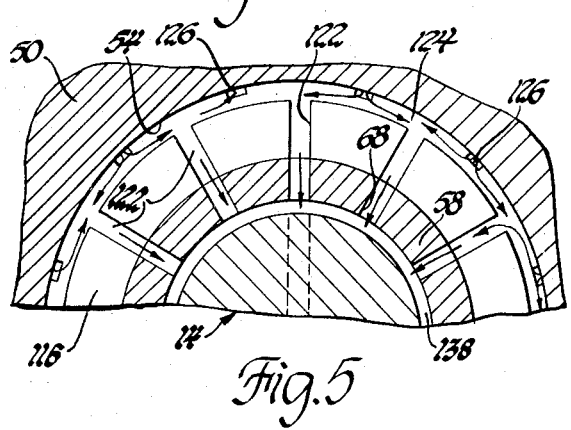
FIG. 5 is an enlarged sectional view taken along line 5—5 of FIG. 2 and looking in the direction of the arrows.

A pair of identical annular flow diverter plates 116 and 118 are disposed within the end ring cooling cavities 90 and 92, respectively. FIGS. 4 and 5 illustrate the mounting of the flow diverter plate 116 in the cooling cavity 90. The outer axial sides of the flow diverter plates 116 and 118 engage the radial side sections 84 and 86 of rotor end plates and the inner axial sides engage the rotor core ends. Radial grooves 120 and 122 are formed in the opposite sides and the outer diameter parts 124 of the flow diverter plates have a reduced thickness with a series of circumferentially spaced radial slots 126. The grooves 120 and 122 and slots 126 direct coolant through the end ring cooling cavities 90 and 92 and in contact with the inner peripheries 54 and 56 of the end rings 50 and 52. Accordingly, the coolant is directed from the two outer radial sleeve holes 66 and 72 of the shaft sleeve 58 to the radial grooves 120 on the outer sides of the flow diverter plates 116 and 118 to the inner peripheries 54 and 56 of the end rings and axially inward through the slots 126 to the grooves 122 on the inner axial sides of the flow diverter plates 116 and 118. The coolant then passes radially along each of the rotor core ends. The coolant path from the end ring cooling cavities 90 and 92 continues to the two inner radial sleeve holes 68 and 70.

A pair of rotor clamping rings are provided by spanner nuts 130 and 132 made of a high-strength heat-treated steel and having internally threaded openings mating with the threads of the sleeve ends 60 and 62. The rotor end plates 76 and 78 clamp the end rings 50 and 52 within the end ring cooling cavities 90 and 92, respectively, and the axial ends 112 and 114 of the annular lips 106 and 108 against the opposite ends of the rotor core 40. The radial side sections 84 and 86 of the rotor end plates are clamped against the outer sides of the flow diverter plates 116 and 118 so that the rotor core is axially compressed and the end rings 50 and 52 are radially and axially supported. In the specific embodiment illustrated, the laminations forming the rotor core 30 are maintained in an axially compressed condition by clamping force exerted by the spanner nuts 130 and 132.

Referring now more particularly to the shaft 14 illustrated in FIG. 2, the center shaft section 30 includes an outer diameter having recessed areas defining first and second pairs of circumferential channels 136, 138 and 140, 142 disposed at opposite ends thereof. The two axially outer circumferential channels 136 and 142 communicate with the outer radial sleeve holes 66 and 72, respectively. The two axially inner circumferential channels 138 and 140 communicate with the inner radial sleeve holes 68 and 70, respectively. A fifth circumferential channel 144 is included in the recessed areas around the middle of the center shaft section 30 substantially equidistant between the circumferential channels 138 and 140.

Figure 3:
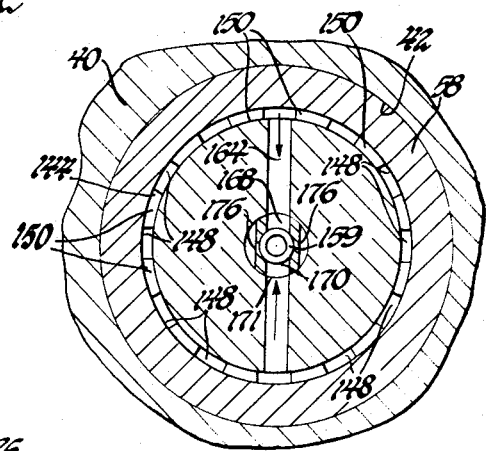
FIG. 3 is an enlarged sectional view taken along lines 3—3 of FIG. 1 and looking in the direction of the arrows.

As illustrated in FIG. 3, which is a cross-sectional view of FIG. 1 taken through the center of the center shaft section 30, s series of circumferentially spaced axial cooling channels 148 are further provided in the recessed areas on the outer diameter of the center shaft portion 30. The axial cooling channels 148 are formed by axially extending lands 150 extending between the inner circumferential channels 138 and 140 and circumferentially spaced apart to define the circumferential channel 144. The outer diameter surfaces of the lands 150 are clamped by the aforementioned interference shrink fit to the shaft sleeve 58 as are the ends of the center shaft section 30. The axial cooling channels 148 and circumferential channels 138 and 140 form a common recessed area which is in heat conducting relationship with the shaft sleeve 58 and the bore 42 of the rotor core 40.

Referring now to the center longitudinal axis of the shaft 14, a pair of inner and outer concentrically disposed and axially extending cooling passages 154 and 156 are provided therein. The outer axial shaft passage 156 is formed by the wall of an axially circular bore 158 which extends from the shaft end 26 to an axial location adjacent the outer circumferential shaft groove 142. The inner axial shaft passage 154 is formed by the inner sidewall of a tube 159 extending within the shaft bore 158 as described further hereinbelow. A first and a second series of radial shaft passages 160 and 162 each include four holes extending between the outer wall of outer shaft passage 156 defined by the shaft bore 158. A third series of radial shaft passages 164 are formed by two diametrically aligned holes extending between the fifth circumferential shaft groove 144 and the shaft bore 158.

A hollow insert 168 illustrated in FIGS. 2 and 3 fluidly connects the third series of radial shaft passages 164 with the inner end of the tube 159. The hollow insert 168 separates the first and second axial shaft passages 154 and 156 within the bore 158. A pair of aligned transverse holes 170 extend into the top and bottom sides 171 so as to be aligned and fluidly connected to the radial shaft passages 164. An axial blind hole 172 extends from the outer axial end of the hollow insert to the pair of transverse holes 170. The inner end of the tube 159 is press fitted into the sides of the blind hole 172 and sealingly supports the outer sidewall of the tube 159.

The pair of top and bottom sides 171 of the insert 168 are cylindrical segments which are sealingly press fitted within the shaft bore 158. The inner axial end of the hollow insert 168 abuts an annular shoulder 174 formed in the bore 158. As illustrated in FIG. 3, a pair of flat sides 176 extend laterally between the pair of top and bottom sides 171 so that the outer axial shaft passage 156 is divided between the oppositely disposed spaces formed between the lateral flat sides 176 and the wall of the bore 158.

Referring further to FIG. 1, a housing end plate 178 includes a center opening which supports an end cap 180 mounted at the left-hand end of the motor housing 16. The end cap 180 provides connections to an external cooling system, described hereinbelow. The outer end of the tube 159 is rotatably supported within the end cap 180 and axially engages a face seal arrangement 182 provided at the opening to an end cap chamber 184 which communicates with a coolant discharge opening 186. Accordingly, the inner axial shaft passage 154 is sealingly connected to the coolant discharge opening 186.

A pipe 188 is fixedly mounted to the shaft end 26 in sealing engagement with the shaft bore 158 and extends to the face seal arrangement 182 so as to circumferentially enclose the tube 159. The pipe 188 forms an extension of the outer axial shaft passage 156 and is rotatably sealed within the center opening of the housing end plate 178. A circumferential series of holes 190 is provided at the end of the pipe 188 to connect the annular space 192 between the pipe and the outer wall of the tube 159 with end cap passages 194 which terminate at a coolant inlet opening 196. Accordingly, a coolant entering flow path is provided from the inlet opening 196 through the end cap passages 194, the holes 190 and then through the annular space 192, and into the shaft bore 158. Also, a coolant exiting flow path is provided from the outer end of the tube 159 to the end cap chamber 184 and the coolant discharge opening 186. The arrangement described above connects the outer and inner axial shaft passages 156 and 154 to the end cap 180.

A rotor cooling circuit for circulating a liquid coolant such as oil is thus provided for the electric drive motor 10 and can be traced by referring to the FIGS. 1 and 2. An external pump 200 and heat exchanger apparatus 202 are connected between the coolant inlet opening 196 and the coolant discharge opening 186 to provide a means for delivering a recirculating supply of oil liquid coolant to the rotor assembly 12. Entering coolant flow is divided between the first and second series of radial shaft passages 160 and 162 at the opposite ends of the axial shaft passage 156. The coolant flow is divided by the lateral sides 176 of the hollow insert 168 and recombines to flow into the radial shaft passages 162. Coolant flow is then directed from circumferential channels 136 and 142 at the opposite axial ends of the center shaft portion 30 through the outer radial sleeve holes 66 and 72 and into the end ring cooling cavities 90 and 92 including the flow diverter plates 116 and 118. The coolant flow passing through the radial grooves 120 and 122 and radial slots 126, contact the inner peripheries 54 and 56 of the pair of end rings 50 and 52 to transfer heat generated therein. Coolant flow circulated in the end ring cooling cavities 90 and 92 also conducts heat from the ends of the rotor core as it is further directed through the axially inner radial sleeve holes 68 and 70 and into the axially inner circumferential channels 138 and 140.

Flow of coolant is then directed axially inward from opposite ends of the axial cooling channels 148. Heat transferred to the coolant is the heat principally generated by the center portions of the conductor bars 48 and conducted through the laminations of the rotor core 40 and the shaft sleeve 58. The heated coolant in the common recessed area including the axial cooling channels 148 is then directed radially inward through the third series of radial shaft passages 164 and into transverse holes 170 of the hollow insert 168. The flow of coolant is then directed axially outward through the axial shaft passage 154 formed by the inner sidewall of the tube 159. The coolant is then discharged from the rotor cooling circuit at the coolant discharge opening 186. The pump 200 and heat exchanger 202 cool the coolant and return it to the cooling inlet opening 196.

Accordingly, a supply of circulating coolant is applied to opposite ends of the squirrel cage rotor to cool the end rings 50 and 52, the rotor core ends and then the inner axial portions of the rotor core 40 along the bore 42. The coolant is directed through the middle of the shaft so that the outer axial shaft passage 156 and concentrically inner axial shaft passage 154 direct entering the exiting coolant flow from a common end of the drive motor housing.

While the embodiment of the present invention as herein disclosed constitutes a preferred form, it is to be understood that other forms may be adopted.

What is claimed is as follows:

1. A cooling arrangement for a squirrel cage rotor assembly of an induction drive motor, comprising: A rotatable shaft including an axial bore; a first and a second series of radial passages extending from said axial bore at opposite ends of said shaft; a third series of radial passages extending from said axial bore axially intermediate said first and said second series of radial passages; a laminated core carried by said shaft axially between said first and second series of radial passages including a series of conductor bars terminated by a pair of conductive end rings extending axially from the ends of said rotor core; a pair of annular end plates carried by said shaft and circumferentially clamped to the ends of said rotor core for forming annular cooling cavities circumscribing the inner peripheries of said pair of conductive end rings in communication with said first and second series of radial passages so that a flow of coolant is directed in heat transferring relationship with said pair of conductive end rings; passage means in further communication with said annular cooling cavities and with said third series of radial passages for directing a flow of coolant therebetween; and a tube member concentrically mounted in said axial bore of said shaft and having the inner wall fluidly connected to said third series of radial passages thereby defining separate concentric flow paths in said axial bore in which one path directs an entering flow of coolant between said axial bore and said first and second series of radial passages and another path directs a discharge flow of coolant between said third series of radial passages and the inner wall of said tube member, whereby a continuous flow path is provided through said squirrel cage rotor assembly for transferring heat to a circulating flow of coolant.

2. A cooling arrangement for a squirrel cage rotor assembly of an induction drive motor, comprising: a rotatable shaft including an axial bore; a first and a second series of radial passages extending from said axial bore at opposite ends of said shaft; a third series of radial passages extending from said axial bore axially intermediate said first and said second series of radial passages; a laminated core carried by said shaft axially between said first and said second series of radial passages including a series of conductor bars terminated by a pair of conductive end rings extending axially from the ends of said rotor core; a pair of annular end plates carried by said shaft and circumferentially clamped to the ends of said rotor core for forming annular cooling cavities circumscribing the inner peripheries of said pair of conductive end rings in communication with said first and second series of radial passages so that a flow of coolant is directed in heat transferring relationship with said pair of conductive end rings; passage means in further communication with said annular cooling cavities and with said third series of radial passages for directing a flow of coolant therebetween; a hollow insert having first side portions sealingly supported by the wall of said axial bore and second side portions spaced from the wall of said axial bore for forming divided flow paths between the ends of said axial bore, said hollow insert including transverse holes extending through said first side portions and fluidly connected with said third series of radial passages and further including an axial blind hole extending from one axial end of said hollow insert and communicating with said transverse holes; and a tube member extending concentrically within said axial bore and sealingly supported at one end in said axial blind hole so as to be fluidly connected with said transverse holes whereby separate concentric flow paths are formed for directing an entering flow of coolant between the said axial bore and said first and second series of radial passages and for discharging a flow of coolant between said third series of radial passages and said tube member so that a continuous flow path is provided through said squirrel cage rotor assembly for transferring heat to a circulating flow of coolant.

3. A cooling arrangement for a squirrel cage rotor assembly of an induction drive motor, comprising: a rotatable shaft including an axial bore; a first and a second series of radial passages extending from said axial bore at opposite ends of said shaft; a third series of radial passages extending from said axial bore axially intermediate said first and said second series of radial passages; a laminated core carried by said shaft axially between said first and said second series of radial passages including a series of conductor bars terminated by a pair of conductive end rings extending axially from the ends of said rotor core; a pair of annular end plates carried by said shaft and circumferentially clamped to the ends of said rotor core for forming annular cooling cavities circumscribing the inner peripheries of said pair of conductive end rings in communication with said first and second series of radial passages so that a flow of coolant is directed in heat transferring relationship with said pair of conductive end rings; passage means fluidly connecting said annular cooling cavities and said third series of radial passages for directing a flow of coolant therebetween; a pair of flow diverter plates extending radially within said annular cooling cavities defining first radial spaces communicating with said first and second radial passages and said inner peripheries of said pair of conductive end rings, and further defining second radial spaces communicating with said inner peripheries of said pair of conductive end rings and said passage means; and a tube member concentrically mounted in said axial bore of said shaft and having the inner wall fluidly connected to said third series of radial passages thereby defining separate concentric flow paths for directing an entering flow of coolant between said axial bore and said first and second series of radial passages and a discharge flow of coolant between said third series of radial passages and the inner wall of said tube member whereby a continuous flow path is provided through said squirrel cage rotor assembly for transferring heat to a circulating flow of coolant.

4. A cooling arrangement for a squirrel cage rotor assembly of an alternating current induction motor, comprising: a cylindrical rotor core including a mounting bore and a circumferential series of winding slots adjacent the outer diameter carrying conductor bars terminated by a pair of axially extending conductive end rings circumferentially disposed on the ends of said rotor core; a rotatable shaft carrying said mounting bore of said rotor core and including an axial bore extending from an opening at one end of said shaft and terminating within said shaft adjacent the other end; a circumferential series of axial cooling channels extending on the outer surface of said shaft between the ends of said rotor core in heat transferring relationship with inner axial portions of said rotor core; first and second series of radial passages extending between said axial bore and the ends of said rotor core; a third series of radial holes extending between said axial cooling channels and said axial bore; a pair of annular end plates carried by said shaft including outer radial portions axially engaging the ends of said rotor core around the outer diameter thereof for supporting said pair of conductive end rings; a pair of annular cooling cavities extending axially between inner radial side sections of said pair of annular end plates and the ends of said rotor core and circumscribing the inner peripheries of said pair of conductive end rings; a pair of flow diverter plates disposed within said pair of annular cooling cavities including outer axial sides engaging said inner radial side sections of said pair of annular end plates and inner axial sides engaging the ends of said rotor core and further including a plurality of circumferentially spaced radial grooves on both axial sides with the grooves on said outer axial sides communicating with said first and second series of radial passages and the grooves on said inner axial sides communicating with opposite ends of said axial cooling channels. Whereby a circuitous flow of liquid coolant is directed through said pair of annular cooling cavities in heat transferring relationship with said pair of conductive end rings and the ends of said rotor core; a hollow insert including interconnected axial and transverse holes extending therein, said hollow insert further including first side portions sealingly engaging the wall of said axial bore adjacent said third series of radial passages for fluidly connecting said transverse holes with said third series of radial passages and second side portions spaced from the wall of said axial bore to form divided flow paths for directing a flow of liquid coolant between the ends of said axial bore; and a tube member concentrically mounted in said axial bore including an inner end sealingly supported by said axial hole of said hollow insert for fluidly connecting said tube member and said third series of radial holes, said tube member further including an outer end extending to said opening at said one end of said shaft for forming a pair of concentric passages within said axial bore, whereby an entering flow of coolant is directed between said axial bore and said first and second series of radial passages and a discharge flow of coolant is directed between said third series of radial passages and said tube member so that a continuous flow path is provided for circulating a flow of liquid coolant from said one end of said shaft.

\* \* \* \* \*